United States Patent
Jin et al.

(10) Patent No.: US 9,564,950 B2
(45) Date of Patent: Feb. 7, 2017

(54) TAG IDENTIFICATION METHOD AND APPARATUS

(71) Applicant: Huawei Device Co.,Ltd., Shenzhen, Guangdong (CN)

(72) Inventors: Zhihao Jin, Beijing (CN); Xinmiao Chang, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 0 days.

(21) Appl. No.: 14/984,041

(22) Filed: Dec. 30, 2015

(65) Prior Publication Data

US 2016/0112098 A1  Apr. 21, 2016

Related U.S. Application Data

(63) Continuation of application No. PCT/CN2013/080225, filed on Jul. 26, 2013.

(51) Int. Cl.
  *H04B 5/00*   (2006.01)
  *G06K 7/10*   (2006.01)
  *H04W 4/00*   (2009.01)

(52) U.S. Cl.
  CPC ......... *H04B 5/0056* (2013.01); *G06K 7/10297* (2013.01); *H04B 5/0031* (2013.01); *H04W 4/001* (2013.01); *H04W 4/008* (2013.01)

(58) Field of Classification Search
  CPC . G06K 7/10297; H04B 5/0031; H04B 5/0056; H04W 4/008
  USPC ............. 455/41.1; 340/10.1, 10.3, 10.4
  See application file for complete search history.

(56) References Cited

U.S. PATENT DOCUMENTS

| | | | |
|---|---|---|---|
| 8,342,415 B2 * | 1/2013 | Soh | G06K 7/10237 235/451 |
| 2006/0069814 A1 | 3/2006 | Abraham et al. | |
| 2008/0046570 A1 | 2/2008 | Abel | |
| 2009/0075592 A1 | 3/2009 | Nystrom et al. | |
| 2009/0111378 A1 | 4/2009 | Sheynman et al. | |
| 2010/0169686 A1 | 7/2010 | Ryoo et al. | |
| 2011/0053504 A1 | 3/2011 | Corda | |
| 2012/0045989 A1 | 2/2012 | Suumaeki et al. | |

(Continued)

FOREIGN PATENT DOCUMENTS

| | | |
|---|---|---|
| CN | 101233476 A | 7/2008 |
| CN | 101675428 A | 3/2010 |

(Continued)

*Primary Examiner* — Tuan Pham
(74) *Attorney, Agent, or Firm* — Huawei Device Co., Ltd.

(57) ABSTRACT

The present invention discloses a tag identification method and apparatus, relates to the field of communications network technologies, which can implement that there are few steps of determining a format of a tag by a device host in an NFC terminal, so that the tag can be quickly processed. In the embodiments of the present invention, a Near Field Communication NFC controller reads a type of a tag; the NFC controller determines whether a format of the tag is an NFC data exchange format NDEF according to the type of the tag; and the NFC controller sends a notification message to a device host when the NFC controller determines that the format of the tag is the NDEF, where the notification message includes that the format of the tag is the NDEF. The solutions provided in the embodiments of the present invention are applicable to identifying a tag.

16 Claims, 4 Drawing Sheets

(56) References Cited

U.S. PATENT DOCUMENTS

| | | | |
|---|---|---|---|
| 2012/0099566 A1 | 4/2012 | Laine et al. | |
| 2012/0135693 A1 | 5/2012 | Teruyama | |
| 2012/0137310 A1 | 5/2012 | Teruyama | |
| 2012/0178366 A1 | 7/2012 | Levy et al. | |
| 2012/0309309 A1 | 12/2012 | Cho et al. | |
| 2013/0052949 A1 | 2/2013 | Yang et al. | |
| 2013/0241709 A1 | 9/2013 | Tiedemann et al. | |
| 2013/0316647 A1* | 11/2013 | Leica | H04B 5/0031 455/41.1 |
| 2014/0065957 A1* | 3/2014 | Gupta | H04W 12/08 455/41.1 |
| 2014/0215166 A1 | 7/2014 | Gallo et al. | |

FOREIGN PATENT DOCUMENTS

| | | |
|---|---|---|
| CN | 102037499 A | 4/2011 |
| CN | 102957456 A | 3/2013 |
| CN | 102970063 A | 3/2013 |
| CN | 103023541 A | 4/2013 |
| EP | 2458899 A1 | 5/2012 |
| EP | 2525604 A2 | 11/2012 |
| JP | 2012118569 A | 6/2012 |
| KR | 20120058407 A | 6/2012 |
| RU | 2488228 C2 | 7/2013 |
| WO | 2008081370 A2 | 7/2008 |
| WO | 2013072437 A1 | 5/2013 |

* cited by examiner

… (1)

TAG IDENTIFICATION METHOD AND APPARATUS

CROSS-REFERENCE TO RELATED APPLICATION

This application is a continuation of International Application No. PCT/CN2013/080225, filed on Jul. 26, 2013, which is hereby incorporated by reference in its entirety.

TECHNICAL FIELD

The present invention relates to the field of communications technologies, and in particular, to a tag identification method and apparatus.

BACKGROUND

Near Field Communication (NFC) is a short-distance wireless connection technology, which can implement communication between electronic devices at a close distance by means of magnetic field induction, where two devices implement data exchange by approaching or colliding.

In the prior art, after an NFC terminal detects an NFC tag, a Near Field Communication controller (Near Field Communication Controller, NFC controller) of the NFC terminal reads entire content of the NFC tag, and then sends the entire content of the NFC tag to a device host of the NFC terminal; the device host processes the NFC tag. Generally, the device host determines, according to the entire content of the NFC tag, whether a format of the NFC tag is in conformity with an NFC data exchange format (NFC Data Exchange Format, NDEF).

However, in the prior art, the device host can determine the format of the NFC tag only by acquiring the entire content of the NFC tag, which causes the device host to read a large amount of data of the NFC tag and perform relatively complex operations.

SUMMARY

Embodiments of the present invention provide a tag identification method and apparatus, which can implement reducing steps of determining a format of a tag by a device host in an NFC terminal, so that an NFC tag can be processed.

According to a first aspect, an embodiment of the present invention provides a tag identification method, including:

reading, by a Near Field Communication (NFC) controller, a type of a tag;

determining, by the NFC controller, whether a format of the tag is an NFC data exchange format (NDEF) according to the type of the tag; and sending, by the NFC controller, a notification message to a device host when the NFC controller determines that the format of the tag is the NDEF, where the notification message includes that the format of the tag is the NDEF.

In a first possible embodiment, with reference to the first aspect, before the reading, by the Near Field Communication (NFC) controller, the type of the tag, the method further includes:

receiving, by the NFC controller, a configuration command sent by the device host, where the configuration command is used to indicate whether the NFC controller performs NDEF detection on the tag.

In a second possible embodiment, with reference to the first aspect or the first possible embodiment of the first aspect, the determining, by the NFC controller, whether the format of the tag is the NFC data exchange format NDEF according to the type of the tag includes:

when the type of the tag is Type 1, determining, by the NFC controller, whether the format of the tag is the NDEF according to header read-only memory HR0 in the tag;

when the type of the tag is Type 2, determining, by the NFC controller, whether the format of the tag is the NDEF according to a capability container CC in the tag;

when the type of the tag is Type 3, determining, by the NFC controller, whether the format of the tag is the NDEF according to System Code in the tag; and when the type of the tag is Type 4, determining, by the NFC controller, whether the format in the tag is the NDEF according to a file identifier of a capability container CC file in the tag.

In a third possible embodiment, with reference to the first aspect or either of the foregoing possible embodiments of the first aspect, before the receiving, by the NFC controller, the configuration command sent by the device host, the method further includes:

sending, by the NFC controller, a format function message to the device host, where the format function message carries information about whether the NFC controller has a capability of performing the NDEF detection on the tag.

In a fourth possible embodiment, with reference to the third possible embodiment of the first aspect, before the sending, by the NFC controller, the format function message to the device host, the method further includes:

receiving, by the NFC controller, an initialization command sent by the device host; and the sending, by the NFC controller, the format function message to the device host includes:

sending, by the NFC controller, an initialization response to the device host, where the initialization response carries the information about whether the NFC controller has a capability of performing the NDEF detection on the tag.

In a fifth possible embodiment, with reference to the first possible embodiment of the first aspect, the configuration command is further used to indicate that the NFC controller performs data type detection on the tag.

In a sixth possible embodiment, with reference to the first aspect or any one of the foregoing possible embodiments of the first aspect, after the sending, by the NFC controller, the notification message to the device host, the method further includes:

receiving, by the NFC controller by using an NDEF radio frequency interface, a read/write command sent by the device host;

converting, by the NFC controller, the read/write command into an NDEF read/write command; and performing, by the NFC controller, data reading/writing on the tag according to the NDEF read/write command.

According to a second aspect, an embodiment of the present invention provides a tag identification apparatus, including:

a reading module, configured to read a type of a tag;

a determining module, configured to determine whether a format of the tag is an NFC data exchange format NDEF according to the type of the tag; and a sending module, configured to send a notification message to a device host when the determining module determines that the format of the tag is the NDEF, where the notification message includes that the format of the tag is the NDEF.

In a first possible embodiment, with reference to the second aspect, the apparatus further includes:

a receiving module, configured to receive a configuration command sent by the device host, where the configuration command is used to indicate whether the NFC controller performs the NDEF detection on the tag.

In a second possible embodiment, with reference to the second aspect or the first possible embodiment of the second aspect, the determining module is specifically configured to:

when the type of the tag is Type 1, determine whether the format of the tag is the NDEF according to header read-only memory HR0 in the tag; when the type of the tag is Type 2, determine whether the format of the tag is the NDEF according to a capability container CC in the tag; when the type of the tag is Type 3, determine whether the format of the tag is the NDEF according to System Code in the tag; and when the type of the tag is Type 4, determine whether the format of the tag is the NDEF according to a file identifier of a capability container CC file in the tag.

In a third possible embodiment, with reference to the second aspect or either of the foregoing possible embodiments of the second aspect, the sending module is further configured to send a format function message to the device host, where the format function message carries information about whether the NFC controller has a capability of performing the NDEF detection on the tag.

In a fourth possible embodiment, with reference to the third possible embodiment of the second aspect, the receiving module is further configured to receive an initialization command sent by the device host; and the sending module is further configured to send an initialization response to the NFC controller, where the initialization response carries the information about whether the NFC controller has a capability of performing the NDEF detection on the tag.

In a fifth possible embodiment, with reference to the first possible embodiment of the second aspect, the configuration command is further used to indicate that the NFC controller performs data type detection on the tag.

In a sixth possible embodiment, with reference to the second aspect or any one of the foregoing possible embodiments of the second aspect, the receiving module is further configured to receive, by using an NDEF radio frequency interface, a read/write command sent by the device host; and the apparatus further includes:

a converting module, configured to convert the read/write command into an NDEF read/write command; and a processing module, configured to perform data reading/writing on the tag according to the NDEF read/write command.

According to a third aspect, an embodiment of the present invention provides a tag identification apparatus, where the apparatus includes a Near Field Communication NFC controller and a device host, and the NFC controller is connected to the device host, where:

the NFC controller is configured to read a type of a tag; and determine whether a format of the tag is an NFC data exchange format NDEF according to the type of the tag; and the NFC controller sends a notification message to the device host when the NFC controller determines that the format of the tag is the NDEF, where the notification message includes that the format of the tag is the NDEF; and the device host is configured to receive the notification message sent by the NFC controller.

In a first possible embodiment, with reference to the third aspect, the device host is further configured to send a configuration command to the NFC controller, where the configuration command is used to indicate whether the NFC controller performs the NDEF detection on the tag; and the NFC controller is further configured to receive the configuration command sent by the device host.

In a second possible embodiment, with reference to the third aspect or the first possible embodiment of the third aspect, the NFC controller is specifically configured to:

when the type of the tag is Type 1, determine whether the format of the tag is the NDEF according to header read-only memory HR0 in the tag; when the type of the tag is Type 2, determine whether the format of the tag is the NDEF according to a capability container CC in the tag; when the type of the tag is Type 3, determine whether the format of the tag is the NDEF according to System Code in the tag; and when the type of the tag is Type 4, determine whether the format of the tag is the NDEF according to a file identifier of a capability container CC file in the tag.

In a third possible embodiment, with reference to the third aspect or either of the foregoing possible embodiments of the third aspect, the NFC controller is further configured to send a format function message to the device host, where the format function message carries information about whether the NFC controller has a capability of performing the NDEF detection on the tag.

In a fourth possible embodiment, with reference to the third possible embodiment of the third aspect, the device host is further configured to send an initialization command to the NFC controller; and the NFC controller is further configured to send an initialization response to the device host after receiving the initialization command sent by the device host, where the initialization response carries the information about whether the NFC controller has a capability of performing the NDEF detection on the tag.

In a fifth possible embodiment, with reference to the first possible embodiment of the third aspect, the configuration command is further used to indicate that the NFC controller performs data type detection on the tag.

In a sixth possible embodiment, with reference to the third aspect or any one of the foregoing possible embodiments of the third aspect, the device host is further configured to establish an NDEF radio frequency interface for performing data transmission with the NFC controller after receiving the notification message sent by the NFC controller.

In a seventh possible embodiment, with reference to the sixth possible embodiment of the third aspect, the device host is further configured to send, by using the NDEF radio frequency interface, a read/write command to the NFC controller; and the NFC controller is further configured to receive, by using the NDEF radio frequency interface, the read/write command sent by the device host; convert the read/write command into an NDEF read/write command; and perform data reading/writing on the tag according to the NDEF read/write command.

According to the tag identification method and apparatus provided in the embodiments of the present invention, an NFC controller reads a type of a tag; and determines whether a format of the tag is an NFC data exchange format according to the type of the tag; and the NFC controller sends a notification message to a device host when the NFC controller determines that the format of the tag is the NFC data exchange format, where the notification message includes information that the format of the tag is the NFC data exchange format. Compared with the prior art in which a device host can determine a format of an NFC tag only by acquiring entire content of the NFC tag, which causes the device host to read a large amount of data of the NFC tag and perform relatively complex operations, the embodiments of the present invention can implement reducing steps of determining a format of a tag by a device host in an NFC terminal, so that the NFC tag can be processed.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
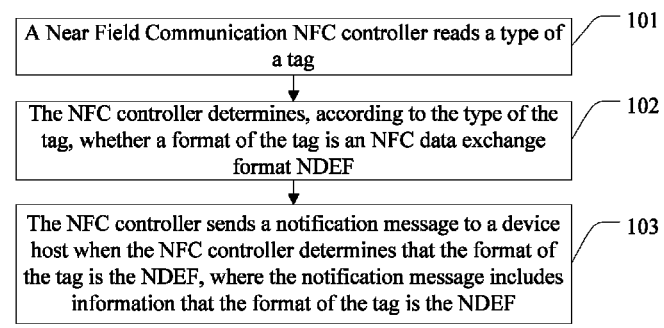
FIG. 1 is a flowchart of a tag identification method according to an embodiment of the present invention.

As shown in FIG. 1, an embodiment of the present invention provides a tag identification method, and the method includes:

101: An NFC controller reads a type of a tag.

The NFC controller is a controller in an NFC terminal. The NFC terminal may be a terminal having an NFC function, such as a mobile phone, a tablet computer, or a camera. For ease of description, the embodiment is described by using a mobile phone having an NFC function as an example. The NFC controller is a logical entity responsible for transmitting data on an NFC radio frequency interface. In an example of a mobile phone having an NFC function, an NFC controller refers to an NFC chip in the mobile phone.

In this embodiment, the tag is an NFC tag. Types of the NFC tag are Type1, Type2, Type3, and Type4. For a manner in which the NFC controller reads the type of the tag, reference may be made to the NFC Forum Analog standard, the NFC Forum Digit standard, and the NFC Forum Activity standard.

The NFC controller may discover the tag and acquire an attribute of the tag by means of radio frequency discovery. For processes in which how the NFC controller discovers the tag and acquires the attribute of the tag by means of the radio frequency discovery, reference may be made to the NFC Forum Analog standard, the NFC Forum Digit standard, and the NFC Forum Activity standard. The attribute of the tag may include a format of the tag, a data type of the tag, a function supported by the tag, and the like. The function supported by the tag herein refers to a capability that is required in a process of establishing communication between the NFC controller and the tag.

102: The NFC controller determines whether a format of the tag is an NDEF according to the type of the tag.

The NDEF defines an encapsulation format of information during information exchange, where the information is transmitted between NFC terminals or between an NFC terminal and an NFC tag. The NDEF may be a lightweight binary message format, and it can be used to encapsulate one or more user-defined data of any type and any size.

When the type of the tag is Type 1, the NFC controller determines whether the format of the tag is the NDEF according to header read-only memory (Header Read-Only Memory, HR)0 in the tag. Specifically, a length of HR0 is one byte, and when four high order bits of HR0 is 0001b, the NFC controller determines that the format of the tag is the NDEF. When the type of the tag is Type 2, the NFC controller determines whether the format of the tag is the NDEF according to a capability container (Capability Container, CC) in the tag. Specifically, a length of the CC is four bytes, and when a value of the first byte is E1h (where E1 is in hexadecimal format), the NFC controller determines that the format of the tag is the NDEF. When the type of the tag is Type 3, the NFC controller determines whether the format of the tag is the NDEF according to System Code in the tag. Specifically, a length of the System Code is two bytes, and when a value of the System Code is 12FCh (where 12FC is in hexadecimal format), the NFC controller determines that the format of the tag is the NDEF. When the type of the tag is Type 4, the NFC controller determines whether the format of the tag is the NDEF according to a file identifier of a capability container (Capability Container, CC) file in the tag. Specifically, a length of the file identifier of the CC file is two bytes, and when a value of the file identifier of the CC file is E103h (where E103 is in hexadecimal format), the NFC controller determines that the format of the tag is the NDEF.

Optionally, when the NFC controller determines that the format of the tag is the NDEF, the NFC controller may further determine a data type of the tag. The tag has eight data types. Specifically, the NFC controller acquires data type information from a TNF field of the tag (Type 1, Type 2, Type 3, and Type 4), and determines the data type of the tag according to content of the data type information. A value of the TNF field may be 0x00, 0x01, 0x02, 0x03, 0x04, 0x05, 0x06, or 0x07, and the NFC controller may determine the data type information of the tag according to the value of the TNF field. The data type of the tag is specifically a type of an NDEF message. 0x00 represents that the NDEF message is an empty message; 0x01 represents that the NDEF message stores an internal data type defined in the RTD (Record Type Define) standard by the NFC Forum standards organization; 0x02 represents that the NDEF message stores a media type defined in the RFC (Request For Comments) 2046 standard, such as a picture and voice; 0x03 represents that the NDEF message stores a uniform resource identifier (Uniform Resource Identifier, URI) defined in the RFC 3986 standard; 0x04 represents that the NDEF message stores an external data type defined in the RTD (Record Type Define) standard by the NFC Forum standards organization; 0x05 represents that the NDEF message stores one piece of data of an unknown type; 0x06 represents that the NDEF message is an intermediate tag among a series of consecutive NDEF tags, where a data type of the tag is the same as that of a previous NDEF tag; and 0x07 represents that the NDEF message is reserved and not in use temporarily.

103: The NFC controller sends a notification message to a device host when the NFC controller determines that the format of the tag is the NDEF, where the notification message includes information that the format of the tag is the NDEF.

The device host is responsible for managing a running environment of the NFC terminal and a peripheral, including managing the NFC controller, such as initialization, configuration and power management. In the example of a mobile phone having an NFC function, the device host may refer to a CPU of the mobile phone.

In this embodiment, for example, the NFC controller sends the notification message to the device host; for example, the notification message is a radio frequency discovery notification RF_DISCOVER_NFT. A specific form of RF_DISCOVER_NFT is shown in Table 1.

TABLE 1

| RF_DISCOVER_NTF | | | |
|---|---|---|---|
| NDEF Info | 1 Octet | X | A nonzero value indicates that a format of a tag is an NDEF, and zero indicates that the format of the tag is not the NDEF |

In Table 1, examples of meanings or values indicated by fields are as follows:

NDEF Info indicates NDEF information, which occupies one byte (1 Octet);

X indicates whether a format of a tag is an NDEF; and when X≠0000 0000, it indicates that the format of the tag is the NDEF.

Optionally, when the NFC controller determines that the format of the tag is not the NFC data exchange format, the NFC controller still can send a notification message to the device host. When X in the notification message (RF_DISCOVER_NFT) meets X=0000 0000, it indicates that the format of the tag is not the NDEF.

Optionally, the notification message sent by the NFC controller to the device host may further include the data type of the tag. For example, the NFC controller sends RF_DISCOVER_NFT to the device host, and a specific form of RF_DISCOVER_NFT is shown in Table 2.

TABLE 2

| RF_DISCOVER_NTF | | | |
|---|---|---|---|
| NDEF Info | 1 Octet | X | A nonzero value indicates that a format of a tag is an NDEF, and zero indicates that the format of the tag is not the NDEF |
| TNF | 1 Octet | X | X indicates a data type of a tag |

In Table 2, examples of meanings or values indicated by fields are as follows:

for detailed descriptions of NDEF Info, reference may be made to the descriptions in Table 1, and details are not described herein again;

type name format (Type Name Format, TNF) indicates information about a data type of a tag, and occupies one byte (1 Octet);

when X=0x00, it indicates that an NDEF message is an empty message (the tag includes the NDEF message); and when X=0x01, it indicates that the NDEF message stores an internal data type defined in the RTD (Record Type Define) standard by the NFC Forum standards organization, and the like.

It should be noted that, X is not limited to indicating a specific data type of a tag in this embodiment. For example, when X=0x07, it indicates that the NDEF message is reserved and not in use temporarily.

According to the tag identification method provided in this embodiment of the present invention, the NFC controller reads the type of the tag; and determines whether the format of the tag is the NFC data exchange format according to the type of the tag; and the NFC controller sends the notification message to the device host when the NFC controller determines that the format of the tag is the NFC data exchange format, where the notification message includes information that the format of the tag is the NFC data exchange format. Compared with the prior art in which the device host can determine the format of the NFC tag only by acquiring entire content of the NFC tag, which causes the device host to read a large amount of data of the NFC tag and perform relatively complex operations, this embodiment of the present invention can implement reducing steps of determining the format of the tag by the device host in the NFC terminal, so that the NFC tag can be processed.

Figure 2:
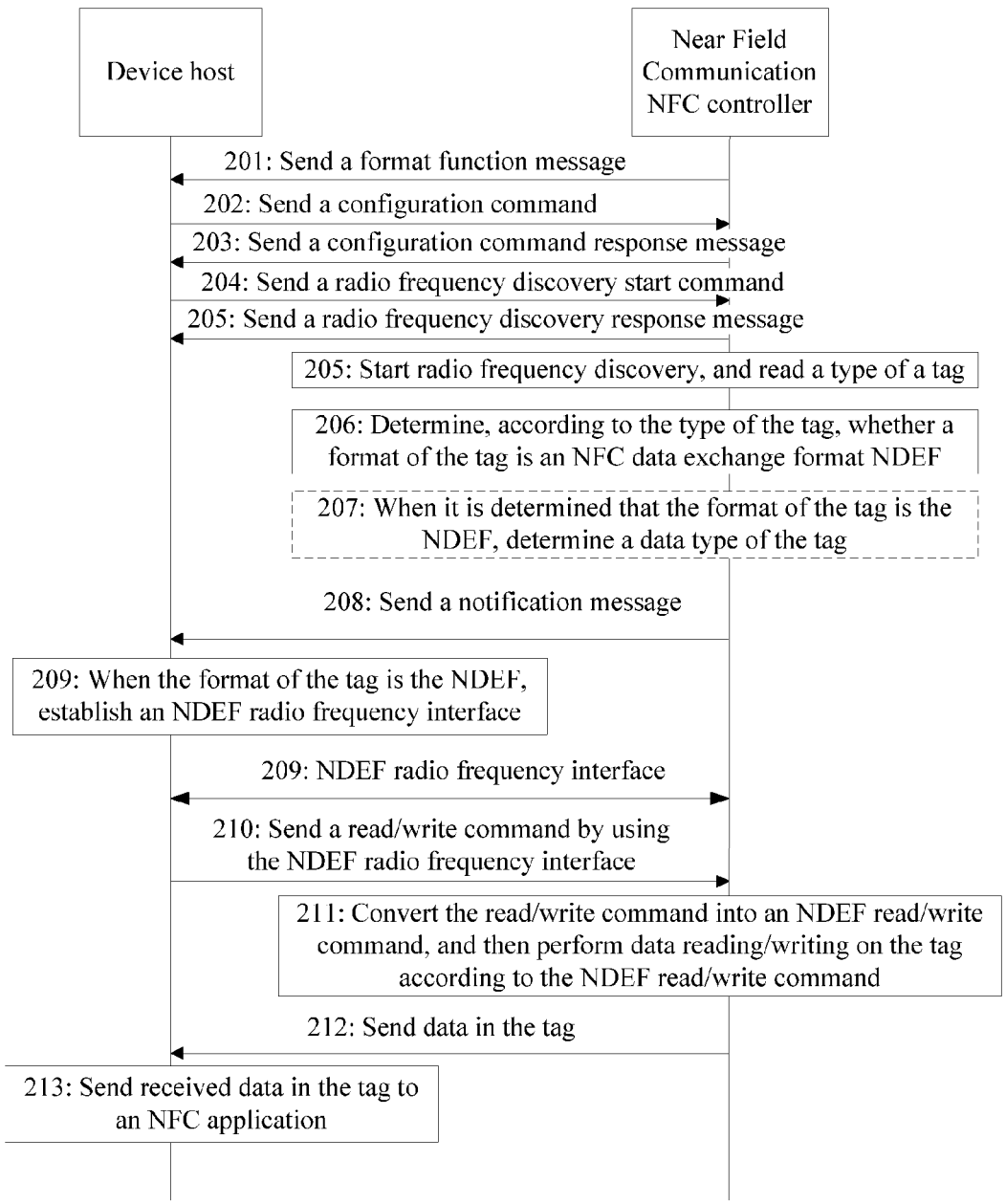
FIG. 2 is a flowchart of another tag identification method according to an embodiment of the present invention.

In another embodiment of the present invention, a tag identification method is provided. As shown in FIG. 2, the method includes:

201: An NFC controller sends a format function message to a device host, where the format function message carries information about whether the NFC controller has a capability of performing NDEF detection on a tag.

Optionally, the NFC controller sends the format function message to the device host in the following two manners:

Manner 1: The device host sends an initialization command to the NFC controller; the NFC controller sends an initialization response to the device host after receiving the initialization command, that is, the format function message is specifically the initialization response, where the initialization command is used to initialize the NFC controller. For example, the device host sends CORE_INIT_CMD (an initialization command) to the NFC controller, that is, the device host initializes the NFC controller; and then the NFC controller feeds back CORE_INIT_RSP (an initialization response) to the device host after receiving CORE_INIT_CMD. In the CORE_INIT_RSP response, when a Supported RF Interface field includes 0x04, that is, NDEF Access RF Interface, it indicates that the NFC controller has a capability of detecting the NDEF.

Manner 2: The device host sends a format query command to the NFC controller; the NFC controller sends an format query response to the device host after receiving the format query command, that is, the format function message is specifically the format query response. For example, the device host sends FORMAT_INQ_CMD (a format query command) to the NFC controller, and then the NFC controller feeds back FORMAT_INQ_RSP (a format query response) to the device host after receiving FORMAT_INQ_CMD.

Certainly, this embodiment is not limited to the foregoing two manners that are used as examples. The NFC controller may further add, to a message sent to the device host, information about whether the NFC controller has a capability of performing NDEF detection on the tag.

202: The device host sends a configuration command to the NFC controller, where the configuration command is used to indicate whether the NFC controller performs NDEF detection on the tag.

For example, the device host sends a CORE_SET_CONFIG_CMD command to the NFC controller, where the CORE_SET_CONFIG_CMD command includes a format parameter. A specific form of the format parameter is shown in Table 3.

TABLE 3

| CORE_SET_CONFIG_CMD | | | | |
|---|---|---|---|---|
| Parameter 1 | 3 Octets | ID | 1 Octet | 0xA0 |
| | | Len | 1 Octet | 1 |
| | | Val | 1 Octet | Zero indicates that NDEF detection is not performed, and a nonzero value indicates that the NDEF detection is performed |

In Table 3, examples of meanings or values indicated by fields are as follows:

Parameter 1 indicates a format parameter, and the format parameter has three bytes (3 Octets); ID (identifier) occupies one byte (1 Octet), and 0xA0 indicates an identifier of the format parameter;

Len (length) occupies one byte (1 Octet), and 1 indicates that a length of Val is one byte; and Val (value) occupies one byte (1 Octet), and when a value of Val is 0000 0000, it indicates that the configuration command instructs the NFC controller not to perform NDEF detection on a tag; when a value of Val is not zero (for example, 0000 0001), it indicates that the configuration command instructs the NFC controller to perform NDEF detection on the tag.

It should be noted that, a value of a byte occupied by Parameter 1 is not limited in this embodiment; when a byte occupied by ID, Len, or Val included in Parameter 1 changes, the value of the byte occupied by Parameter 1 may also change.

Optionally, the configuration command is further used to indicate that the NFC controller performs data type detection on the tag. When the CORE_SET_CONFIG_CMD command sent by the device host to the NFC controller is further used to indicate that the NFC controller performs data type detection on the tag, the CORE_SET_CONFIG_CMD command includes a format parameter and a data type parameter, where there are two representation manners for CORE_SET_CONFIG_CMD, and the specific forms are shown in Table 4 and Table 5.

TABLE 4

| CORE_SET_CONFIG_CMD | | | | |
|---|---|---|---|---|
| Parameter 1 | 3 Octets | ID | 1 Octet | 0xA0 |
| | | Len | 1 Octet | 1 |
| | | Val | 1 Octet | Zero indicates that NDEF detection is not performed, and a nonzero value indicates that the NDEF detection is performed |
| Parameter 2 | 3 Octets | ID | 1 Octet | 0xA1 |
| | | Len | 1 Octet | 1 |
| | | Val | 1 Octet | X indicates a data type of a tag that needs to be detected |

For detailed descriptions of the format parameter Parameter 1, reference may be made to the descriptions in Table 3, and details are not described herein again.

In Table 4, examples of meanings or values indicated by fields are as follows:

Parameter 2 indicates a data type parameter, and the data type parameter has three bytes (3 Octets);

ID (identifier) occupies one byte (1 Octet), and 0xA1 indicates an identifier of the data type parameter;

Len (length) occupies one byte (1 Octet), and 1 indicates that a length of Val is one byte; and Val (value) occupies one byte (1 Octet), and when a value X of Val is 0101 0000, it indicates that the configuration command instructs the NFC controller to perform detection on the second and fourth data types. It can be understood that, the tag has eight data types; the device host arranges the eight data types in a specific sequence, and makes each bit of a value of Val correspond to one data type. When a bit in X is 1, it indicates a data type corresponding to the bit needs to be detected; when the bit is 0, it indicates a data type corresponding to the bit does not need to be detected. For example, a sequence, from the first type to the eighth type, of the eight data types is as follows: 0x00, 0x01, 0x02, 0x03, 0x04, 0x05, 0x06, and 0x07. Correspondingly, the first bit is corresponding to 0x00, the second bit is corresponding to 0x01, the third bit is corresponding to 0x02, the fourth bit is corresponding to 0x03, and by analogy, the eighth bit is corresponding to 0x07. According to a requirement of the configuration command in Table 4, the NFC controller detects whether the data type of the tag is either of the two data types: 0x01 or 0x03.

TABLE 5

| CORE_SET_CONFIG_CMD | | | | |
|---|---|---|---|---|
| Parameter 1 | 3 Octets | ID | 1 Octet | 0xA0 |
| | | Len | 1 Octet | 1 |
| | | Val | 1 Octet | Zero indicates that NDEF detection is not performed, and a nonzero value indicates that the NDEF detection is performed |
| Parameter 2 | 3 Octets | ID | 1 Octet | 0xA1 |
| | | Len | 1 Octet | 1 |
| | | Val | 1 Octet | Zero indicates data type detection is not performed, and a nonzero value indicates the data type detection is performed |

In Table 5, examples of meanings or values indicated by fields are as follows:

for detailed descriptions of the format parameter Parameter 1, reference may be made to the descriptions in Table 3, and details are not described herein again;

Parameter 2 indicates a data type parameter, and the data type parameter has three bytes (3 Octets);

ID (identifier) occupies one byte (1 Octet), and 0xA1 indicates an identifier of the data type parameter;

Len (length) occupies one byte (1 Octet), and 1 indicates that a length of Val is one byte; and Val (value) occupies one byte (1 Octet), and when a value of Val is 0000 0000, it indicates that the configuration command instructs the NFC controller not to perform data type detection on a tag; when a value of Val is not zero (for example, 0000 0001), it indicates that the configuration command instructs the NFC controller to perform data type detection on the tag.

In this step, for descriptions of the device host, the NFC controller, and the NDEF, reference may be made to step 102 in FIG. 1.

203: The NFC controller sends a configuration command response message to the device host.

After receiving the configuration command sent by the device host, the NFC controller sends the configuration command response message to the device host, where the configuration command response message may be CORE_SET_CONFIG_RSP.

204: The device host sends a radio frequency discovery start command to the NFC controller.

After receiving the configuration command response message sent by the NFC controller, the device host sends the radio frequency discovery start command to the NFC controller; or the device host waits, after sending the configuration command, for a predetermined time to start to send the radio frequency discovery start command to the NFC controller. For example, the device host sends RF_DIS_CMD (a radio frequency discovery start command) to the NFC controller.

A range of the predetermined time is not limited in this embodiment. For example, when the predetermined time is 200 ms, the device host starts to send the radio frequency discovery start command to the NFC controller 200 ms after sending the configuration command to the NFC controller.

205: The NFC controller sends a radio frequency discovery response message to the device host, and starts radio frequency discovery to read a type of the tag.

The radio frequency discovery response message includes notification information that the NFC controller has received the radio frequency discovery start command. For example, the NFC controller sends RF_DIS_RSP (a radio frequency discovery response message) to the device host.

206: The NFC controller determines whether a format of the tag is an NDEF according to the type of the tag.

For a manner in which the NFC controller determines whether a format of the tag is an NDEF, reference may be made to step 102 in FIG. 1, and details are not described herein again.

207: When determining that the format of the tag is the NDEF, the NFC controller determines the data type of the tag.

It should be noted that, this step is an optional step, and the NFC controller needs to execute step 207 only when the configuration command further includes information indicating that the NFC controller detects the data type of the tag. Therefore, in FIG. 2, step 207 is expressed with a dashed line box.

For a manner in which the NFC controller determines a data type of the tag, reference may still be made to step 102 in FIG. 1.

208: The NFC controller sends a notification message to the device host.

For detailed descriptions of the notification message, reference may be made to step 103 in FIG. 1.

209: When the format of the tag is the NDEF, the device host establishes an NDEF radio frequency interface.

The NDEF radio frequency interface is an interface between the device host and the NFC controller. The NFC controller sends data transmitted between the NFC controller and the tag (where the format of the tag is the NDEF) to the device host by using the NDEF radio frequency interface; or the device host first sends, to the NFC controller by using the NDEF radio frequency interface, data to be sent to the tag, and then the NFC controller forwards the data to the tag.

Specifically, the device host sends RF_DISCOVER_SELECT_CMD (a radio frequency discovery select command) to the NFC controller, where the RF_DISCOVER_SELECT_CMD includes information that the device host has established the NDEF radio frequency interface. A specific form of RF_DISCOVER_SELECT_CMD is shown in Table 6.

TABLE 6

| RF_DISCOVER_SELECT_CMD | |
|---|---|
| RF Discovery ID | XX |
| RF Protocol | Tag Protocol |
| RF Interface | NDEF RF Interface |

In Table 6, examples of meanings or values indicated by fields are as follows:

RF Discovery ID indicates a radio frequency discovery identifier, and is used to identify a tag corresponding to radio frequency discovery;

XX indicates an identifier of the tag;

RF Protocol indicates a manner of communication between the NFC controller and the tag (for example, the Tag Protocol); and RF Interface indicates an interface between the device host and the NFC controller (for example, the NDEF radio frequency interface).

After the NDEF radio frequency interface is established between the device host and the NFC controller, and after the NFC controller receives the data sent by the device host, the NFC controller may convert the data into data in a format that can be received by the tag. The tag is a tag that is identified by an RF Discover ID corresponding to the NDEF radio frequency interface.

It can be understood that, in step 201 to step 209, an interface used by the NFC controller to perform interaction with the device host may be an NFC controller interface (NFC controller Interface, NCI). The NCI is a logical interface between the device host and the NFC controller, and the NCI is configured to transmit various commands between the device host and the NFC controller.

210: The device host sends a read/write command to the NFC controller by using the NDEF radio frequency interface.

The read/write command is used to acquire the data in the tag, or the read/write command is used to modify the data in the tag.

211: The NFC controller converts the read/write command into an NDEF read/write command, and then performs data reading/writing on the tag according to the NDEF read/write command.

Content of read/write commands received by different types of NFC tags is different. For example, a read/write command received by a Type 1 tag is Read, and a read/write command received by a Type 2 tag is R. The NFC controller converts, by using the NDEF radio frequency interface, the read/write command sent by the device host into NDEF read/write commands corresponding to different types of tags. The NDEF read/write command may be an NDEF read command, or may be an NDEF write command.

For example, the NFC controller sends an NDEF read command to the NFC tag, where the NDEF read command instructs the NFC tag to send data in the tag. After receiving the NDEF read command, the NFC tag sends the data in the tag to the NFC controller.

212: The NFC controller sends the data in the tag to the device host.

213: The device host sends the received data in the tag to an NFC application.

It should be noted that, before step 213, the device host may receive a registration message sent by the NFC application. Specifically, after being installed or when running for the first time, the NFC application performs registration with the device host according to a capability, of processing a data type of a tag, of the NFC application. For example, a browser application program supporting NFC scanning may register a data type, namely URI (0x03), with the device host.

When the notification message includes that the format of the tag is the NDEF, the device host sends the data in the tag to a running application. For example, running applications include a browser supporting NFC scanning, a video player supporting the NFC scanning, and a photo album supporting the NFC scanning. The device host sends the data in the tag to the foregoing three running applications, and the foregoing three running applications process the tag according to an actual situation (a capability, of processing a data type of a tag, of an application).

When the notification message includes that the format of the tag is the NDEF and includes the data type of the tag, the device host sends the data in the tag to an application corresponding to the data type. For example, running applications include a browser supporting NFC scanning, a video player supporting the NFC scanning, and a photo album supporting the NFC scanning. If the data type of the tag is URI (0x03), the device host sends, according to the data type of the tag, the data in the tag to the browser supporting the NFC scanning.

According to the tag identification method provided in this embodiment of the present invention, it can be implemented that the device host in the NFC terminal determines the format of the tag and the data type of the tag by using the NFC controller. After obtaining the format of the tag and the data type of the tag, the device host sends, according to the data type of the tag, data in the tag to an application corresponding to the data type of the tag for processing, so that the device host can determine the format of the tag and the data type of the tag without requiring analyzing entire content of the tag; in addition, the NDEF radio frequency interface established by the device host can enable the data in the NFC tag to be transmitted between the device host and the NFC controller, thereby achieving an objective that the tag can be processed by the device host.

Figure 3:
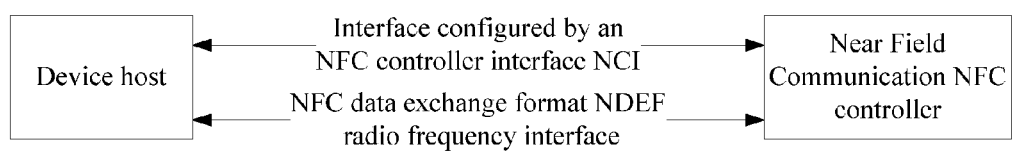
FIG. 3 is a schematic diagram of a transmission structure, between a device host and an NFC controller and between the NFC controller and a tag, in a tag identification method according to an embodiment of the present invention.

In an implementation manner of this embodiment of the present invention, a transmission interface between a device host and an NFC controller is clearly described. As shown in FIG. 3, before the device host receives a notification message sent by the NFC controller (that is, before the device host establishes an NDEF radio frequency interface), command transmission between the device host and the NFC controller is performed by using an NCI; and after the device host receives the notification message sent by the NFC controller, the device host establishes the NDEF radio frequency interface, and NDEF data transmission between the device host and the NFC controller is performed by using the NDEF radio frequency interface.

Figure 4:
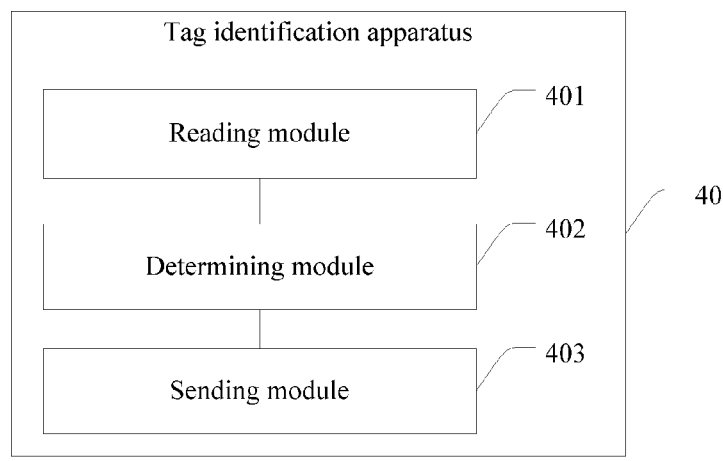
FIG. 4 is a schematic structural diagram of a tag identification apparatus according to an embodiment of the present invention.

As shown in FIG. 4, an embodiment of the present invention provides a tag identification apparatus 40, including: a reading module 401, a determining module 402, and a sending module 403. The apparatus may be a unit of an NFC terminal, for example, an NFC controller.

The reading module 401 is configured to read a type of a tag.

The determining module 402 is configured to determine whether a format of the tag is an NDEF according to the type of the tag, and send a result of the determining to the sending module 403.

The sending module 403 is configured to send a notification message to a device host when the determining module 402 determines that the format of the tag is the NDEF, where the notification message includes that the format of the tag is the NDEF.

For detailed descriptions of the notification message, reference may be made to step 103 in FIG. 1.

Figure 5:
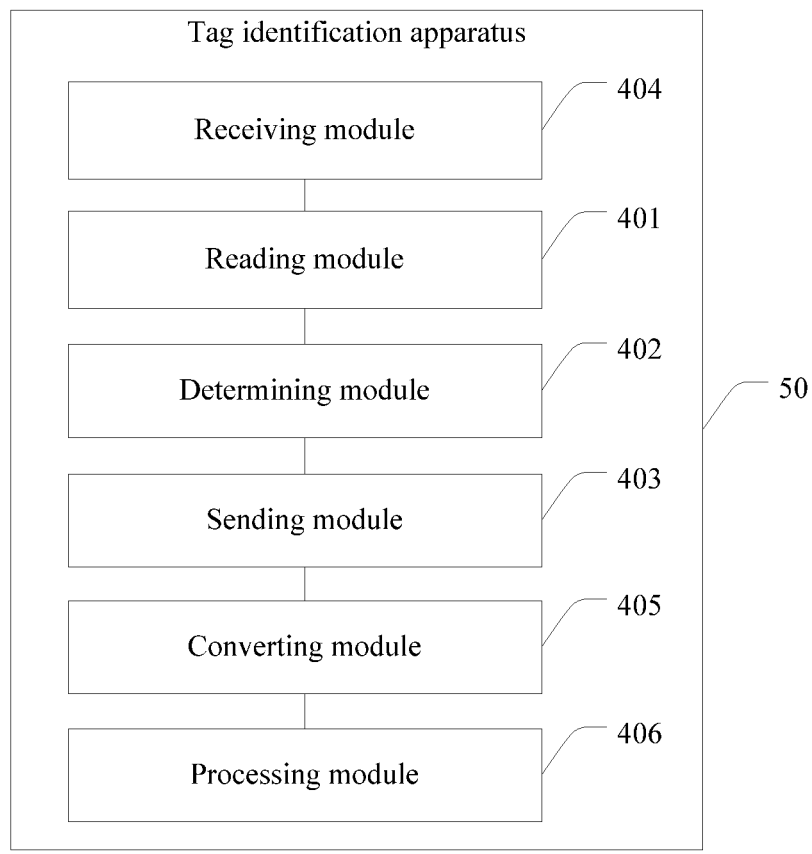
FIG. 5 is a schematic structural diagram of another tag identification apparatus according to an embodiment of the present invention.

Further, as shown in FIG. 5, in a tag identification apparatus 50, the tag identification apparatus 50 further includes: a receiving module 404, a converting module 405, a processing module 406.

Specifically, before the reading module 401 reads the type of the tag, the sending module 403 sends a format function message to the device host, where the format function message carries information about whether the NFC controller has a capability of performing NDEF detection on the tag. Specifically, the format function message may be an initialization response. For example, the receiving module 404 receives an initialization command sent by the device host; then the sending module 403 sends the initialization response to the NFC controller, where the initialization response carries the information about whether the NFC controller has a capability of performing NDEF detection on the tag.

When the initialization response carries the information about whether the NFC controller has a capability of performing NDEF detection on the tag, the receiving module 404 receives a configuration command sent by the device host, where the configuration command is used to indicate whether the NFC controller performs NDEF detection on the tag. It can be understood that, when the configuration command indicates that the NFC controller needs to perform NDEF detection on the tag, the reading module 401 reads the type of the tag.

Optionally, the configuration command is further used to indicate that the NFC controller performs data type detection on the tag.

Further, when the type of the tag is Type 1, the determining module 402 determines whether the format of the tag is the NDEF according to HR0 in the tag; when the type of the tag is Type 2, the determining module 402 determines whether the format of the tag is the NDEF according to a CC in the tag; when the type of the tag is Type 3, the determining module 402 determines whether the format of the tag is the NDEF according to System Code in the tag; and when the type of the tag is Type 4, the determining module 402 determines whether the format of the tag is the NDEF according to a file identifier of a CC file in the tag.

Further, after the sending module 403 sends the notification message to the device host, the receiving module 404 receives, by using an NDEF radio frequency interface, a read/write command sent by the device host, the converting module 405 converts the read/write command into an NDEF read/write command, and then the processing module 406 performs data reading/writing on the tag according to the NDEF read/write command.

According to the tag identification apparatus provided in this embodiment of the present invention, it can be implemented that the device host in the NFC terminal determines the format of the tag and the data type of the tag by using the NFC controller. After obtaining the format of the tag and the data type of the tag, the device host sends, according to the data type of the tag, data in the NFC tag to an application corresponding to the data type of the tag for processing, so that the device host can determine the format of the tag and the data type of the tag without requiring analyzing entire content of the NFC tag.

Figure 6:
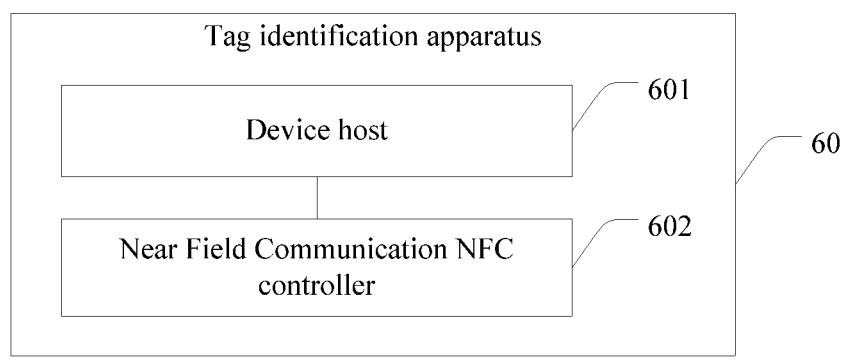
FIG. 6 is a schematic structural diagram of still another tag identification apparatus according to an embodiment of the present invention.

As shown in FIG. 6, an embodiment of the present invention provides a tag identification apparatus 60, including: an NFC controller 601 and a device host 602, where the NFC controller 601 is connected to the device host 602.

The NFC controller 601 is configured to read a type of a tag; and determine whether a format of the tag is an NFC data exchange format NDEF according to the type of the tag; and the NFC controller 601 sends a notification message to the device host 602 when the NFC controller 601 determines that the format of the tag is the NDEF, where the notification message includes that the format of the tag is the NDEF.

When the type of the tag is Type 1, the NFC controller 601 determines whether the format of the tag is the NDEF according to HR0 in the tag; when the type of the tag is Type 2, the NFC controller 601 determines whether the format of the tag is the NDEF according to a CC in the tag; when the type of the tag is Type 3, the NFC controller 601 determines whether the format of the tag is the NDEF according to System Code in the tag; and when the type of the tag is Type 4, the NFC controller 601 determines whether the format of the tag is the NDEF according to a file identifier of a CC file in the tag.

For detailed descriptions of the notification message, reference may be made to step 103 in FIG. 1.

The device host 602 is configured to receive the notification message sent by the NFC controller 601.

Further, the NFC controller 601 is further configured to send a format function message to the device host 602, where the format function message carries information about whether the NFC controller 601 has a capability of performing NDEF detection on the tag. Specifically, the format function message may be an initialization response. For example, the device host 602 first sends an initialization command to the NFC controller 601. After receiving the initialization command sent by the device host 602, the NFC controller 601 sends the initialization response to the device host 602, where the initialization response carries the information about whether the NFC controller has a capability of performing NDEF detection on the tag.

Further, the device host 602 is further configured to send a configuration command to the NFC controller, where the configuration command is used to indicate whether the NFC controller 601 performs NDEF detection on the tag.

The NFC controller 601 is further configured to receive the configuration command sent by the device host 602.

Optionally, the configuration command is further used to indicate that the NFC controller 601 performs data type detection on the tag.

Further, the device host 602 is further configured to establish an NDEF radio frequency interface for performing data transmission with the NFC controller 601 after receiving the notification message sent by the NFC controller 601.

Further, the device host 602 is further configured to send a read/write command to the NFC controller 601 by using the NDEF radio frequency interface.

The NFC controller 601 is further configured to receive, by using the NDEF radio frequency interface, the read/write command sent by the device host 602; convert the read/write command into an NDEF read/write command; and perform data reading/writing on the tag according to the NDEF read/write command.

The apparatus shown in FIG. 6 may be an NFC terminal, where the NFC terminal may be a terminal having an NFC function, such as a mobile phone, a tablet computer, and a camera.

It should be noted that, because content such as specific implementation processes of modules and information exchange between the modules in the apparatus 60 shown in FIG. 6 is based on a same invention concept as method embodiments of the present invention, reference may be made to the method embodiments, and details are not described herein again.

According to the tag identification apparatus provided in this embodiment of the present invention, it can be implemented that the device host in the NFC terminal determines the format of the tag and the data type of the tag by using an NFC controller. After obtaining the format of the tag and the data type of the tag, the device host sends, according to the data type of the tag, data in the NFC tag to an application corresponding to the data type of the tag for processing, so that the device host can determine the format of the tag and the data type of the tag without requiring analyzing entire content of the NFC tag.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A tag identification method, comprising:
    reading, by a Near Field Communication (NFC) controller, a type of a tag;
    performing, by the NFC controller, NFC data exchange format (NDEF) detection on the tag according to the type of the tag; and
    sending, by the NFC controller, a notification message to a device host when a result of the NDEF detection is that a format of the tag is an NDEF, wherein the notification message comprises that the format of the tag is the NDEF.

2. The method according to claim 1, wherein before the reading, by the Near Field Communication (NFC) controller, the type of the tag, the method further comprises:
    receiving, by the NFC controller, a configuration command sent by the device host, wherein the configuration command is configured to indicate whether the NFC controller performs the NDEF detection on the tag.

3. The method according to claim 1, wherein the performing, by the NFC controller, the NDEF detection on the tag according to the type of the tag comprises:
    when the type of the tag is Type 1, performing, by the NFC controller, the NDEF detection on the tag according to header read-only memory HR0 in the tag;
    when the type of the tag is Type 2, performing, by the NFC controller, the NDEF detection on the tag according to a capability container CC in the tag;
    when the type of the tag is Type 3, performing, by the NFC controller, the NDEF detection on the tag according to System Code in the tag; and
    when the type of the tag is Type 4, performing, by the NFC controller, the NDEF detection on the tag according to a file identifier of a capability container CC file in the tag.

4. The method according to claim 2, wherein before the receiving, by the NFC controller, the configuration command sent by the device host, the method further comprises:
    sending, by the NFC controller, a format function message to the device host, wherein the format function message carries information about whether the NFC controller has a capability of performing the NDEF detection on the tag.

5. The method according to claim 4, wherein before the sending, by the NFC controller, the format function message to the device host, the method further comprises:
    receiving, by the NFC controller, an initialization command sent by the device host; and
    the sending, by the NFC controller, the format function message to the device host comprises:
    sending, by the NFC controller, an initialization response to the device host, wherein the initialization response carries the information about whether the NFC controller has the capability of performing the NDEF detection on the tag.

6. The method according to claim 2, wherein the configuration command is further used to indicate that the NFC controller performs data type detection on the tag.

7. The method according to claim 1, wherein after the sending, by the NFC controller, the notification message to the device host, the method further comprises:
    receiving, by the NFC controller by using an NDEF radio frequency interface, a read/write command sent by the device host;
    converting, by the NFC controller, the read/write command into an NDEF read/write command; and
    performing, by the NFC controller, data reading/writing on the tag according to the NDEF read/write command.

8. A tag identification apparatus, comprising:
    a Near Field Communication (NFC) controller; and
    a device host coupled to the NFC controller, wherein the NFC controller is configured to read a type of a tag;
    perform NFC data exchange format (NDEF) detection on the tag according to the type of the tag; and
    send a notification message to the device host when a result of the NDEF detection is that a format of the tag is an NDEF, wherein the notification message comprises that the format of the tag is the NDEF, and wherein the device host is configured to receive the notification message sent by the NFC controller.

9. The apparatus according to claim 8, wherein the device host is further configured to send a configuration command to the NFC controller, wherein the configuration command is configured to indicate whether the NFC controller performs the NDEF detection on the tag, and wherein the NFC controller is further configured to receive the configuration command sent by the device host.

10. The apparatus according to claim 8, wherein the NFC controller is configured to
    when the type of the tag is Type 1, perform the NDEF detection on the tag according to header read-only memory HR0 in the tag;
    when the type of the tag is Type 2, perform the NDEF detection on the tag according to a capability container CC in the tag;
    when the type of the tag is Type 3, perform the NDEF detection on the tag according to System Code in the tag; and
    when the type of the tag is Type 4, perform the NDEF detection on the tag according to a file identifier of a capability container CC file in the tag.

11. The apparatus according to claim 8, wherein the NFC controller is further configured to send a format function message to the device host, wherein the format function message carries information about whether the NFC controller has a capability of performing the NDEF detection on the tag.

12. The apparatus according to claim 11, wherein the device host is further configured to send an initialization command to the NFC controller, and wherein the NFC controller is further configured to send an initialization response to the device host after receiving the initialization command sent by the device host, wherein the initialization response carries the information about whether the NFC controller has the capability of performing the NDEF detection on the tag.

13. The apparatus according to claim 9, wherein the configuration command is further configured to indicate that the NFC controller performs data type detection on the tag.

14. The apparatus according to claim 8, wherein the device host is further configured to establish an NDEF radio frequency interface for performing data transmission with the NFC controller after receiving the notification message sent by the NFC controller.

15. The apparatus according to claim 8, wherein the device host is further configured to send, by using an NDEF radio frequency interface, a read/write command to the NFC controller, and wherein the NFC controller is further configured to receive, by using the NDEF radio frequency interface, the read/write command sent by the device host;

convert the read/write command into an NDEF read/write command; and perform data reading/writing on the tag according to the NDEF read/write command.

16. The apparatus according to claim 8, wherein the apparatus is one of a mobile phone, a tablet computer and a camera.

\* \* \* \* \*